Patented Aug. 17, 1948

2,447,363

UNITED STATES PATENT OFFICE 2,447,363

COMPOUND OF UROBILINOGEN AND HIPPURIC ACID AS ANTIPRESSOR

Harold M. Rabinowitz, Brooklyn, N. Y.

No Drawing. Application June 15, 1945,
Serial No. 599,771

4 Claims. (Cl. 167—74.5)

This invention relates to a composition for use in lowering blood pressure and particularly to an antipressor resulting from mixing urobilinogen and hippuric acid.

In a copending application, Ser. No. 477,161, filed by me on February 25, 1943 and entitled Antipressor and method of making, now Patent No. 2,392,878 dated January 15, 1946, I have described an effective antipressor composition made from urobilinogen and benzoic acid.

The present composition is effective for the same purpose. Also it is tolerated exceptionally well by tissues so that there is no local irritation when the composition is introduced in solution either intramuscularly or intravenously, is without harmful effect upon the kidneys by which the excess of the composition is excreted, and is adapted for oral administration.

It should be understood, however, that the composition is to be administered only by a physician or surgeon.

The present invention comprises an antipressor consisting of the product of mixing urobilinogen and hippuric acid, the antipressor when used by injection being preferably dissolved in an aqueous mildly alkaline solution for which sodium bicarbonate is an example of a suitable alkali.

The urobilinogen used as an ingredient or raw material may be provided in any convenient manner as, for instance, as described in my said copending application.

The urobilinogen is then mixed with hippuric acid and suitably also with alkali metal carbonate, particularly sodium or potassium carbonate. The term carbonate as used herein includes bicarbonate.

The proportion in which the urobilinogen is used may be varied as may also the proportion of the hippuric acid to the weak alkali present in the aqueous solution. Ordinarily I use about as much of a urobilinogen concentrate as will dissolve in the hot aqueous solution of hippuric acid. Using an aqueous solution of hippuric acid at about 95° C., I have added and stirred in as much of the urobilinogen as dissolves, as shown by an excess of the material floating in the solution.

In one formula for injection I use the urobilinogen and hippuric acid composition in conjunction with sufficient alkali, such as sodium bicarbonate, to bring the pH of the resulting mixture when dissolved in water to the alkaline side or at least to about the pH of normal blood, say within the range 6.7 to 7.7.

The composition made by mixing urobilinogen and hippuric acid and without adding any sodium bicarbonate or the like may be administered in dry form orally. When so administered the dose for the average hypertensive is 200 to 200 mg. per day, suitably in 100 mg. capsules to be taken two or three times daily. When administered in a sodium bicarbonate solution, the amount injected is the same on the dry basis. For a solution containing 100 mg. of the urobilinogen and hippuric acid composition per cc. of 10% solution of sodium bicarbonate, the amount for intramuscular or intravenous injection is 2 to 5 cc. and ordinarily about 3 cc.

A total of about 40 or more human patients suffering from high blood pressure have been treated by injection at intervals of a few days, usually once or twice a week, as long as symptoms of hypertension persist. In every instance satisfactory results have been obtained. The systolic blood pressure has been reduced by 30 to 60 points, the reduction being usually greater the higher the blood pressure initially. Diastolic blood pressures have been lowered in proportion.

The antipressor composition is particularly adapted to be administered orally. It is well tolerated by the gastro-intestinal tract and the kidneys. Also its effectiveness when given orally is not destroyed by the liver. For such oral administration, the urobilinogen and hippuric acid composition requires no sodium carbonate or other neutralizing agent.

An example of the preparation of a urobilinogen concentrate and its further conversion into the antipressor of the present invention is given below.

Five gallons of urine obtained from horses or other liver-bearing animals are mixed thoroughly with 3 gallons of butyl ether. The mixing is continued by agitation for several hours. Then the mixture is allowed to stand overnight, during which time two layers separate.

The upper layer includes the butyl ether, fat, and other material extracted by the ether. This layer is separated by drawing off and is discarded.

The lower dark aqueous layer is slowly evaporated at a temperature not substantially above 170° F., to about one-third of its original volume. Glacial acetic acid is then added in amount sufficient to make the whole slightly acidic. Evaporation is then resumed and continued until a semi-fluid black mass is obtained.

This residual pasty material is then extracted thoroughly with ethyl acetate and the resulting ethyl acetate solution is filtered from undissolved material. The filtrate is evaporated to dryness to give a dried brown mass. This residue is then dissolved as far as possible in a mixture of equal parts of 95% alcohol and chloroform. The resulting solution is filtered away from the undissolved and undesired material.

The filtrate so obtained is then mixed with an equal volume of distilled water, the whole being thoroughly mixed and then allowed to separate on standing into two layers. The upper layer is an aqueous alcoholic layer and the lower is a chloroform solution.

The lower or chloroform layer is separated by being withdrawn from the vessel and evaporated to dryness. There is left a tobacco colored material which is the desired urobilinogen concentrate, sometimes referred to herein as urobilinogen.

It is advantageous from the standpoint of economy to extract, with additional portions of chloroform, the aqueous alcoholic layer separated in the method described, filter the chloroform extracts so obtained, evaporate them to dryness, and add the resulting residue to the main fraction of urobilinogen concentrate that has been described.

Urobilinogen so made or obtained from other sources is then mixed with hot water and the hippuric acid and the whole heated until the urobilinogen either is all dissolved or no more dissolves. This usually requires 5 to 10 minutes when the temperature is around 80° to 100° C. Suitable proportions are 2 to 10 parts by weight of urobilinogen, this term including urobilinogen concentrate, for 100 of hippuric acid.

In combining the urobilinogen and hippuric acid, the urobilinogen is suitably added in portions and stirred into a previously made solution of the hippuric acid in water heated to just below the boiling point of the solution. The addition of the urobilinogen is continued until an excess is present, as shown by floating of undissolved material on the top of the solution.

The hot solution so made is then poured through filter paper and the filtrate allowed to cool. There are thus formed crystals of the antipressor composition.

The supernatant liquor is then removed as by being decanted and filtered. The remaining solid material is dried.

The product appears in the form of long, columnar crystals of ecru to brown color. The melting point is about 193° to 194° C.

Before use by injection, the crystal material so made is dissolved in a solution of alkali metal carbonate, advantageously in the proportion of 10 g. of the crystals to 100 cc. of a 10% sodium bicarbonate solution. The solution so made is warmed on a water vat at a low temperature until solution is complete and there is eliminated most at least of the carbon dioxide gas generated.

While the invention is not limited to any theory of explanation of the results obtained, it is considered that the urobilinogen and the hippuric acid react to give a compound, by the mechanism of neutralization in part at least of the basic groups of urobilinogen by hippuric acid and that the alkali metal carbonate, when used, neutralizes any remaining acidity.

When introduced into the human system, the antipressor is quickly available for its antipressor effect without placing upon any organ of the body the duty of supplying a solubilizing agent or eliminating a toxic ingredient, no toxic ingredient being present in the antipressor composition.

It will be understood that it is intended to cover all changes and modifications of the example of the invention herein chosen for the purpose of illustration which do not constitute departures from the spirit and scope of the invention.

What I claim is:

1. An antipressor composition consisting of the compound of urobilinogen with hippuric acid.

2. An antipressor composition consisting of the compound of urobilinogen and hippuric acid and a mildly alkaline water soluble substance.

3. An antipressor composition consisting of the compound of urobilinogen and hippuric acid and an alkali metal carbonate.

4. An antipressor comprising the composition described in claim 1 and an aqueous solution of sodium carbonate, the antipressor being dissolved in the said solution.

HAROLD M. RABINOWITZ.

REFERENCES CITED

The following references are of record in the file of this patent:

UNITED STATES PATENTS

| Number | Name | Date |
|---|---|---|
| 2,190,248 | Wollheim | Feb. 13, 1940 |
| 2,253,124 | Hartmann | Aug. 19, 1941 |
| 2,256,933 | Wollheim | Sept. 29, 1941 |
| 2,392,878 | Rabinowitz | Jan. 15, 1946 |

FOREIGN PATENTS

| Number | Country | Date |
|---|---|---|
| 295,680 | Great Britain | Dec. 27, 1929 |
| 460,137 | Great Britain | Jan. 15, 1937 |

OTHER REFERENCES

Matthews—Physiological Chem. (6th ed.) pages 1203–1207, William & Wilkins, Baltimore, Md. 1939.

Wood-LaWall—U. S. Dispensatory, 22nd edition, page 1410, J. P. Lippincott Co. 1937.